March 23, 1965 A. J. HAUCK 3,175,175
UNITARY TRANSFORMER AND SATURABLE REACTOR
Filed Jan. 22, 1960 3 Sheets-Sheet 1
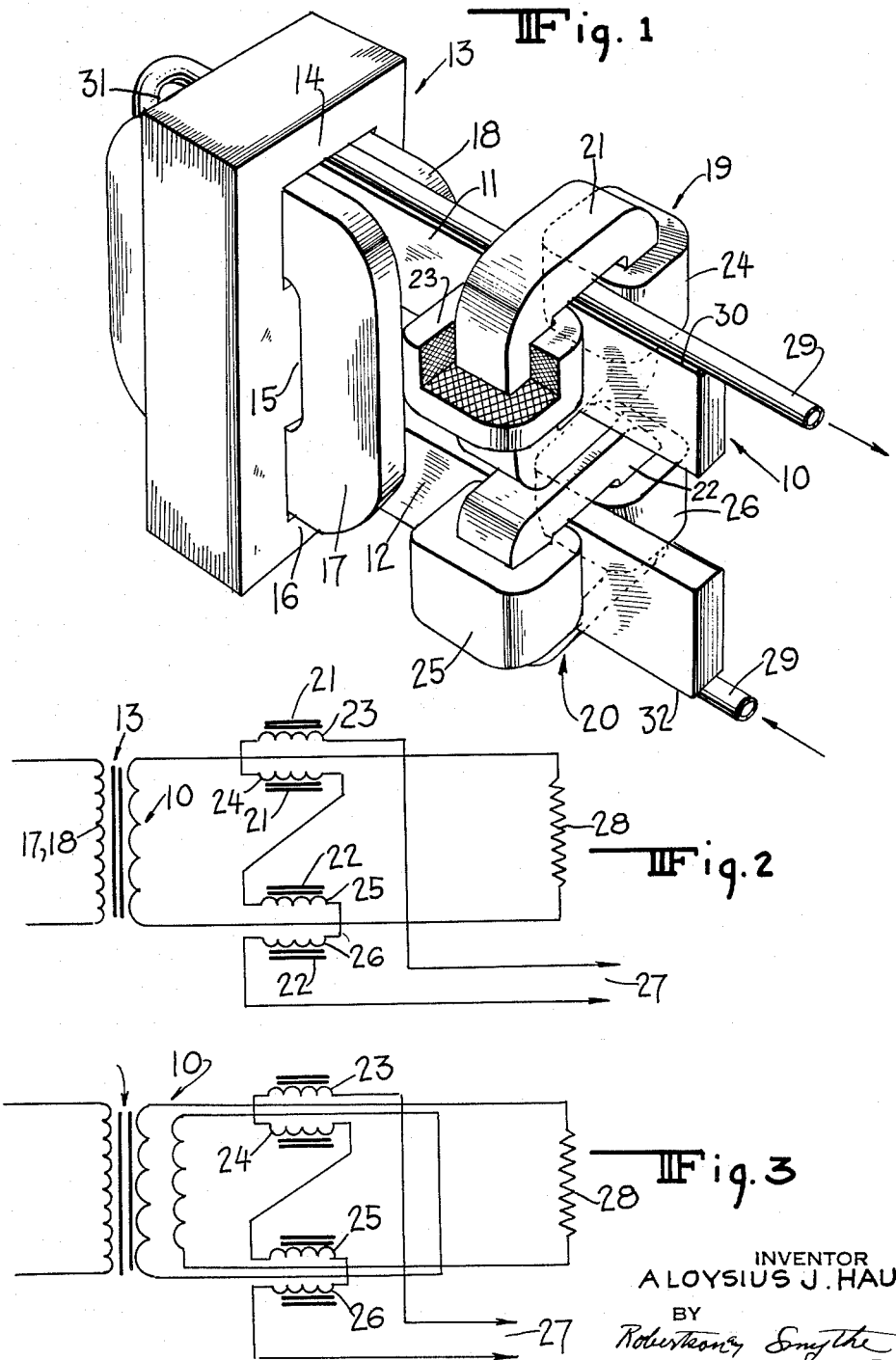

March 23, 1965 A. J. HAUCK 3,175,175
UNITARY TRANSFORMER AND SATURABLE REACTOR
Filed Jan. 22, 1960 3 Sheets-Sheet 2

INVENTOR
ALOYSIUS J. HAUCK
BY
Robertson & Smythe
ATTORNEYS

March 23, 1965 A. J. HAUCK 3,175,175
UNITARY TRANSFORMER AND SATURABLE REACTOR
Filed Jan. 22, 1960 3 Sheets-Sheet 3

INVENTOR
ALOYSIUS J. HAUCK
BY
Robertson & Smythe
ATTORNEYS

United States Patent Office 3,175,175
Patented Mar. 23, 1965

3,175,175
UNITARY TRANSFORMER AND SATURABLE
REACTOR
Aloysius J. Hauck, Milwaukee, Wis., assignor, by mesne assignments, to Basic Product Corporation, Milwaukee, Wis., a corporation of Wisconsin
Filed Jan. 22, 1960, Ser. No. 4,062
11 Claims. (Cl. 336—175)

The present invention relates to transformers combined with saturable reactors, and particularly to a new and improved transformer and saturable reactor of unitary construction.

Such devices as carbon tube type electric furnaces require controllable high load current at relatively low voltage.

The principal object of the invention is to provide a combined transformer and saturable reactor of minimum size and requiring a minimum of material for a given rating.

Another object of the invention is to provide such a combined transformer and saturable reactor of unitary form.

Another object of the invention is to provide a combined transformer and saturable reactor of unitary construction that is water-cooled.

Still another object of the invention is to provide such a combined transformer and saturable reactor in which certain parts may be combined to reduce the number of parts required and yet retain the function of the eliminated parts.

Still another object of the invention is to provide a combined unitary transformer and saturable reactor in which the output of the transformer secondary is of high amperage and low voltage.

In one aspect of the invention, a transformer may include a primary coil or winding and a secondary coil or winding, the latter coil of which may comprise any type of winding although in the embodiment disclosed, it is shown as of single and multiple turn construction. While the secondary winding of the transformer may be of a multiple turn construction, the principles of the invention have their greatest effectiveness in transformers in which the output of the secondary is of high amperage and low voltage.

In another aspect of the invention, the secondary winding, which may comprise a single or multiple turn, may be employed not only as the load winding of the transformer, but the load winding of a saturable reactor means that is combined with the transformer. In this way separate load windings for the transformer and saturable reactor means may be combined, eliminating the necessity of separate load windings for the transformer secondary and the saturable reactor means.

In still another aspect of the invention, the secondary of the transformer which acts also as the load winding of the saturable reactor means may be provided with water cooling means in order to remove the excessive heat incident to the high amperage and low voltage output of the transformer secondary.

Other objects, advantages and features of the combined unitary transformer and saturable reactor will become evident from the following specification and accompanying drawings which are merely exemplary.

In the drawings:

FIG. 1 is a perspective view of a unitary combined transformer and saturable reactor means to which the principles of the invention have been applied;

FIG. 2 is a schematic wiring diagram of the transformer shown in FIG. 1;

FIG. 3 is a schematic wiring diagram of the transformer shown in FIG. 1 in a modified form;

Figure 4:
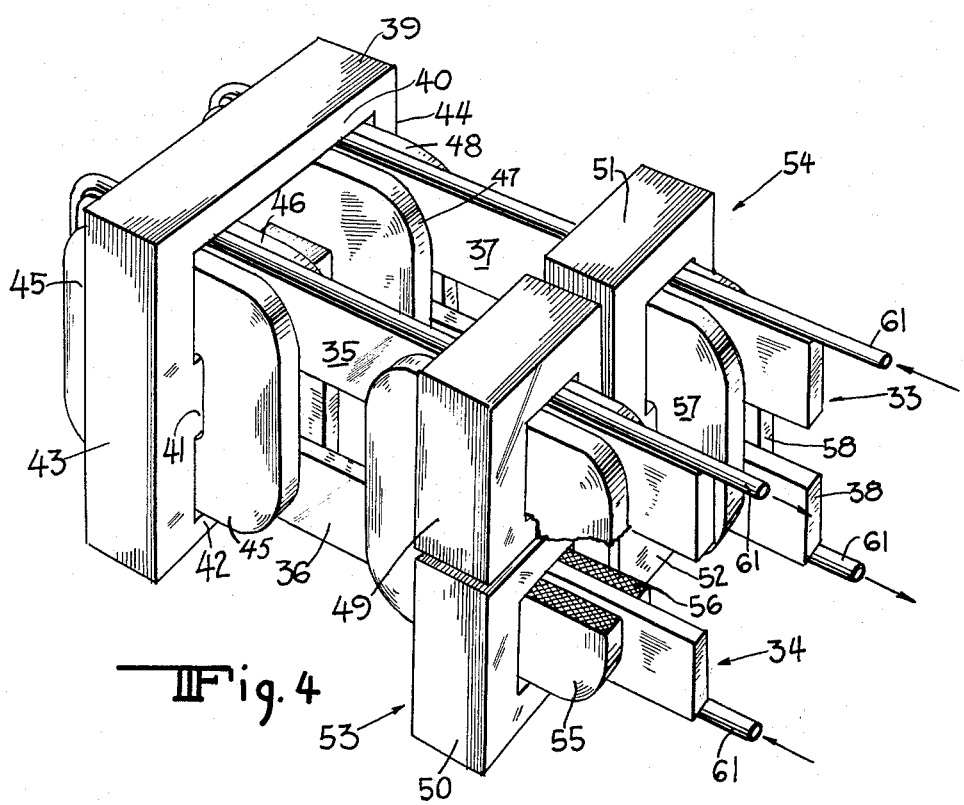
FIG. 4 is a perspective view of a combined unitary transformer and saturable reactor means of modified form from that shown in FIG. 1, and to which the principles of the invention have been applied.

Referring to the drawings, and particularly to FIGS. 1 and 2, the principles of the invention are shown as applied to a unitary combined transformer and saturable reactor means including a secondary winding 10 which in the embodiment disclosed in FIG. 1 is shown as a single turn winding in the general form of a U-shaped bar having legs 11 and 12. A transformer core 13 may include three legs 14, 15 and 16. The leg 15 may pass through the secondary 10 between the legs 11 and 12, and the legs 14 and 16 may be joined to the leg 15 forming an iron core surrounding each leg 11 and 12.

Disc or pancake-type primary coils 17 and 18 may be wound about the leg 15 of core 13.

In order to control the current to the load from secondary 10, separate saturable reactors 19 and 20 may be combined with the legs 11 and 12 of secondary 10 to provide a unitary construction requiring a minimum of material and to be of a minimum size for a given rating. In the embodiment disclosed in FIG. 1, separate cores 21 and 22 may surround legs 11 and 12 of secondary 10. Series connected saturable reactor control windings 23, 24 and 25, 26 may be provided for the cores 21 and 22, respectively.

From the foregoing it is evident that the legs 11 and 12 not only act as the secondary of the transformer, but also as the load windings of the saturable reactors 19 and 20. Referring to FIG. 2, the series connected control windings 23 to 26 are adapted to be connected to a direct current control supply source 27, and a load 28 may be connected across the secondary comprising the secondary of the transformer and the load or gate windings of the saturable reactor.

With no direct current applied to control windings 23 to 26, cores 21 and 22 will be unsaturated so that the legs 11 and 12 have a relatively high reactance tending to reduce the current flowing through the load 28 as compared with the situation when direct current is applied to control windings 23 to 26, so as to tend to saturate the reactor cores.

When the principles of the invention are applied to a relatively high-current low-voltage output transformer, provision must be made to remove the heat generated in secondary 10. In the embodiment disclosed in FIG. 1, this has been accomplished by providing a hollow heat-conducting tube 29 in association with the secondary 10. The tube 29 may be made of copper or similar metal and may be brazed to the edges 30, 31 and 32 of the U-shaped secondary 10. Cooling liquid may be circulated through the tube 29 at any desired rate necessary to maintain the secondary 10 at a safe temperature. Of course, the cooling coils may be connected in series or parallel from a common header when a multi-turn secondary construction is employed. It is understood that insulating couplings may be required in some applications.

Referring to FIG. 3, the water-cooled secondary 10 may be made of multiple turns as distinguished from the single turn shown in FIG. 1.

Figure 5:
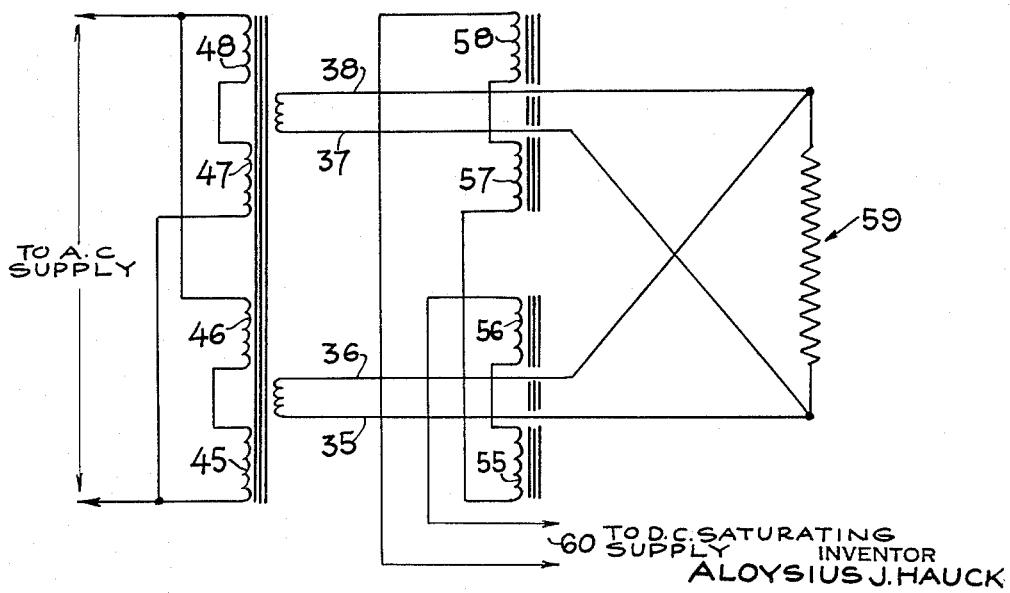
FIG. 5 is a schematic wiring diagram of the unitary combined transformer and saturable reactor means shown in FIG. 4.

Referring to FIGS. 4 and 5, the principles of the invention are shown as applied to a unitary combined two-turn water-cooled transformer with through-type saturable reactor means associated with the secondaries of the transformer in a manner similar to that explained in connection with FIGS. 1 and 2. The construction of FIG. 4 may include a transformer having generally U-shaped secondaries 33 and 34. The secondaries 33 and 34 may be similar to secondary 10 of FIG. 1 and may be provided with legs 35, 36, 37 and 38. A core structure 39 may include three legs 40, 41 and 42, the leg 41 extending between the two sets of legs 35, 36 and 37, 38. The outer legs 40 and 42 may extend over the top and bottom of the secondaries 33 and 34, and they may be joined by outer legs 43 and 44.

Disc or pancake-type primary coils 45, 46, 47 and 48 may be provided for the secondaries 33 and 34, and they may surround the center leg 41 of the core 39 with coils 45 and 46 on opposite sides of secondary 33; and coils 47 and 48 arranged on opposite sides of secondary 34.

Separate cores 49, 50, 51 and 52 may, respectively, surround the legs 35, 36, 37 and 38 of U-shaped secondaries 33 and 34 for saturable reactors 53 and 54. Disc or pancake direct current control windings 55, 56, 57 and 58 may be provided for the saturable reactors 53 and 54, and they may be arranged with coils 55 and 56 spanning both legs 35 and 36 and located on opposite sides thereof; while coils 57 and 58 span both legs 37 and 38 and are located on opposite sides thereof. The separate cores 49, 50 and 51, 52 may be replaced by two three-legged cores without changing the mode of operation.

Referring to FIG. 5, the output of each secondary 33 and 34 is connected across a load 59, and the series connected coils 55, 56, 57 and 58 are connected to a direct current source 60. Furthermore, while a two-turn transformer including turns 33 and 34 has been shown in FIG. 5, multiples of two turns may be employed if desired.

Referring again to FIG. 4, each of the secondaries 33 and 34 may be provided with water or other liquid cooling means such as hollow copper or high heat conductive tubing 61 brazed to the one edge of the U-shaped secondaries in order to cool the secondaries. This tubing may be arranged in series or parallel relation as previously described.

Figures 6, 7:
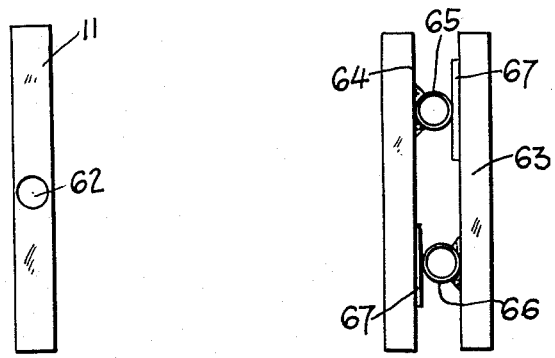
FIGS. 6 and 7 are partial views of a detail of the invention.

Referring to FIG. 6, a modified form of cooling passage is shown as a bored hole or passage 62 located centrally and longitudinally along a leg such as leg 11. In this respect, each leg 11 and 12 may be provided with such a bore, and the end member including end 31 may include a similar bore that intersects the bores 62, to form a continuous coolant path throughout the extent of the secondary 10.

Referring to FIG. 7, still another modified form of cooling means is disclosed in which a split bar including elements 63 and 64 may comprise the secondary winding of the transformer. In this modified form, heat transfer tubes 65 and 66 may be brazed to the surface of elements 64 and 63, respectively, and sheets of insulation 67 may be located between the tubes 65 and 66 and the plates 64 and 63 to which they are not brazed.

Figure 8:
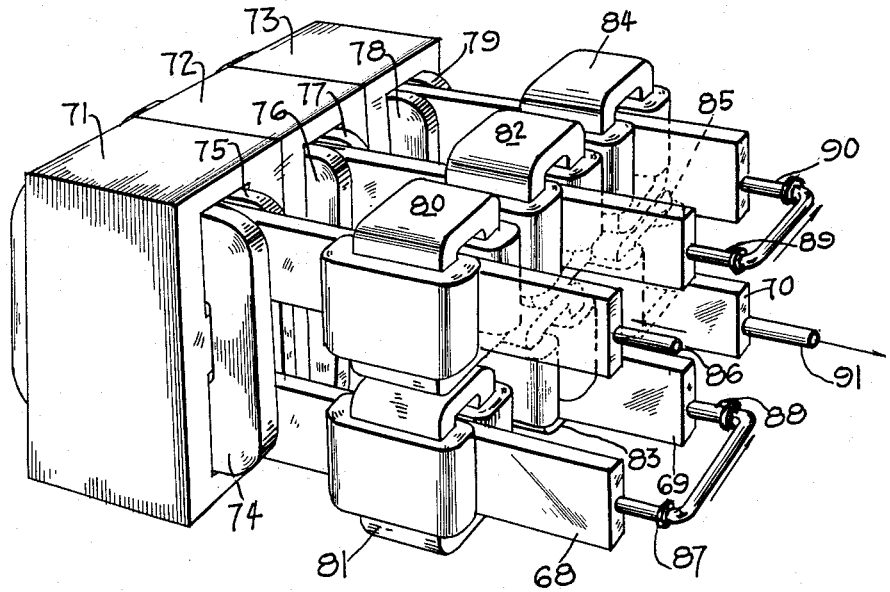
FIG. 8 is a perspective view of a three-phase transformer combined with saturable reactor means, and to which the principles of the invention have been applied.

Referring to FIG. 8, the principles of the invention are shown as applied to a three-phase transformer combined with saturable reactor means. Separate secondaries 68, 69 and 70 similar to the secondary 10 of FIG. 1 may be U-shaped in form and the legs of which may extend through the windows of separate transformer cores 71, 72 and 73. Pancake or disc-type primary coils 74, 75; 76, 77; and 78, 79 may be mounted on opposite sides of their corresponding secondaries 68, 69 and 70, respectively, and may extend through the windows of their corresponding cores 71, 72 and 73, respectively. The primaries 74, 75; 76, 77; and 78, 79 may be delta or Y connected to a source of alternating current.

Series connected saturable reactors 80, 81; 82, 83; and 84, 85 may be associated with the secondaries 68, 69 and 70. Each may include a separate core surrounding each leg of its corresponding secondary, and separate series connected control windings may encircle the legs of the corresponding cores and be located on opposite sides of the corresponding secondary legs. In such a construction, the secondaries 68, 69 and 70 perform a dual function in that they not only supply current to a load that may be connected to them by a Y or delta connection in a known manner, but also act as the load coils of the saturable reactors 80, 81; 82, 83; and 84, 85. By varying the direct current from the direct current supply to the control coils of the saturable reactors 80, 81; 82, 83; and 84, 85, the current flowing to the load can effectively be controlled.

In order to remove the heat generated in the secondaries 68, 69 and 70, each may be provided with cooling duct means as previously described. The inlet duct means within secondary 68 may be connected to an inlet fitting 86, and the outlet of the duct means in secondary 68 may be connected to a line 87 leading to an inlet 88 of the secondary 69. An outlet fitting 89 may connect the duct means within secondary 69 to an inlet fitting 90 leading to the duct means associated with secondary 70, and an outlet fitting 91 may exhaust to a drain.

From the foregoing it is evident that a combined water-cooled unitary transformer and saturable reactor has been provided which consumes a minimum of space and requires a minimum of material for a given rating.

Although the various features of the unitary, water-cooled transformer and saturable reactor have been shown and described in detail to fully disclose several embodiments of the invention, it will be evident that changes may be made in such details and certain features may be used without others without departing from the principles of the invention.

What is claimed is:
1. In a combined unitary transformer and saturable reactor adapted to provide a controlled high-amperage low-voltage output from said transformer, comprising primary winding means; first core means; bar secondary means for said primary winding means; separate core means for said saturable reactor; saturable reactor control winding means in cooperating position with said bar secondary means on said separate core means such that said bar means acts as the load winding for said saturable reactor as well as the secondary for said transformer; means for supplying control current to said control winding means; and means for liquid cooling said bar means.

2. In a combined unitary transformer and saturable reactor adapted to provide a controlled high-amperage low-voltage output from said transformer, comprising core means having electrically connected spaced primary winding means wound thereon; bar means passing between said spaced primary winding means and surrounding a leg of said core means; separate saturable reactor core means surrounding the legs of said bar means; series connected saturable reactor control winding means wound on said saturable reactor core means and located on each side of each leg of said bar means; and means for liquid cooling said bar means.

3. In a combined unitary transformer and saturable reactor adapted to provide a controlled high-amperage low-voltage output from said transformer, comprising core means having electrically connected spaced primary winding means wound thereon; U-shaped bar means passing between said spaced primary winding means and surrounding a leg of said core means; separate saturable reactor core means surrounding the legs of said U-shaped bar means; series connected saturable reactor control winding means wound on said saturable reactor core means and located on each side of each leg of said U-shaped bar means; and means for liquid cooling said U-shaped bar means.

4. In a combined unitary single-phase transformer and saturable reactor adapted to provide a controlled high-amperage low-voltage output from said transformer, comprising in combination, core means having electrically connected spaced primary winding means wound thereon; a single turn, U-shaped bar passing between said spaced primary winding means and surrounding a leg of said core means; separate saturable reactor core means surrounding the legs of said bar; electrically connected saturable reactor control winding means wound on said saturable reactor core means and located on opposite sides of each leg of said U-shaped bar; and means for liquid cooling said bar.

5. In a combined unitary single-phase transformer and saturable reactor adapted to provide a controlled high-amperage low-voltage output from said transformer, comprising in combination, core means having electrically connected spaced primary winding means wound thereon; a multiple turn bar passing between said spaced primary winding means and surrounding a leg of said core means; separate saturable reactor core means surrounding the legs of said multiple turn bar; electrically connected saturable reactor control winding means wound on said saturable reactor core means and located on opposite sides of each leg of said multiple turn bar; and means for liquid cooling said bar.

6. In a combined unitary single-phase transformer and saturable reactor adapted to provide a controlled high-amperage low-voltage output from the transformer, comprising in combination, core means having a plurality of electrically connected spaced pairs of primary winding means wound thereon, each pair including spaced windings; a single turn, U-shaped bar passing between the windings of each pair and surrounding a leg of said core means; separate saturable reactor core means surrounding each leg of each bar; electrically connected saturable reactor control winding means wound on said saturable reactor core means and located on opposite sides of each of the legs of said bar; and means for liquid cooling all of said bars.

7. In a combined unitary poly-phase transformer and saturable reactor adapted to provide a controlled high-amperage low-voltage output from the transformer, comprising, in combination, separate core means for each phase having spaced, electrically connected primary winding means on each core means; a separate U-shaped bar passing between the primary means for each core means and encircling a leg of the corresponding core means; separate saturable reactor core means surrounding each leg of each U-shaped bar; electrically connected saturable reactor control winding means wound on each of said saturable reactor core means and located on opposite sides of each of the legs of each of said bars; and liquid cooling means common to all of said bars for cooling the same.

8. In a combined unitary transformer and saturable reactor, the combination comprising primary winding means; first core means saturable reactor control winding means adjacent said primary winding means; and second separate core means for said saturable reactor upon which said control winding means are mounted; secondary winding means being common to said primary winding means and said saturable reactor control winding means for acting as the secondary winding means of said transformer and also the load winding means of said saturable reactor.

9. In a combined unitary transformer and saturable reactor adapted to provide a controlled high-amperage low-voltage output from said transformer, comprising primary winding means; first core means bar secondary means for said primary winding means; separate core means for said saturable reactor; saturable reactor control winding means on said separate core means in cooperating position with said bar secondary means such that said bar means acts as the load winding for said saturable reactor as well as the secondary for said transformer; and means for supplying control current to said control winding means.

10. In a combined unitary transformer and saturable reactor adapted to provide a controlled high-amperage, low-voltage output from said transformer, comprising core means having primary winding means wound thereon; bar means surrounding a portion of said core means; separate saturable reactor core means surrounding a portion of said bar means; and saturable reactor control winding means wound on said saturable reactor core means.

11. In a combined unitary poly-phase transformer and saturable reactor adapted to provide a controlled high-amperage, low-voltage output from the transformer, comprising in combination, separate core means for each phase having primary winding means on each core means; a separate U-shaped bar encircling a portion of the corresponding core means; separate saturable reactor core means surrounding a portion of each U-shaped bar; and saturable reactor control winding means wound on said saturable reactor core means.

References Cited by the Examiner
UNITED STATES PATENTS

| | | | |
|---|---|---|---|
| 2,067,143 | 1/37 | Logan | 323—89 |
| 2,137,878 | 11/38 | Kramer | 336—170 XR |
| 2,374,059 | 4/45 | Wentz | 323—89 |
| 2,767,257 | 10/56 | Woerdemann | 323—89 |
| 2,790,948 | 4/57 | Wennerberg | 323—56 |

FOREIGN PATENTS 64,910  5/14  Austria.

JOHN F. BURNS, *Primary Examiner.*
ORIS L. RADER, *Examiner.*